United States Patent
Davis

(10) Patent No.: US 12,014,376 B2
(45) Date of Patent: Jun. 18, 2024

(54) AUTOMATED VERIFICATION OF USER INTERFACE PROCESS FLOWS

(71) Applicant: PAYPAL, INC., San Jose, CA (US)

(72) Inventor: Dieter Davis, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/062,392

(22) Filed: Dec. 6, 2022

(65) Prior Publication Data

US 2023/0102077 A1 Mar. 30, 2023

Related U.S. Application Data

(63) Continuation of application No. 15/931,322, filed on May 13, 2020, now Pat. No. 11,521,210.

(51) Int. Cl.
- G06Q 20/40 (2012.01)
- G06F 9/451 (2018.01)
- G06F 40/14 (2020.01)

(52) U.S. Cl.
CPC ......... *G06Q 20/4016* (2013.01); *G06F 9/451* (2018.02); *G06F 40/14* (2020.01); *G06Q 20/4015* (2020.05)

(58) Field of Classification Search
CPC ..... G06F 9/451; G06F 40/14; G06Q 20/4015; G06Q 20/4016
See application file for complete search history.

(56) References Cited

U.S. PATENT DOCUMENTS

| | | | |
|---|---|---|---|
| 7,337,411 B1 | 2/2008 | Racine et al. | |
| 9,170,915 B1 | 10/2015 | Fateev | |
| 10,534,696 B1 | 1/2020 | Beales et al. | |
| 2004/0003335 A1 | 1/2004 | Gertz et al. | |
| 2011/0078556 A1 | 3/2011 | Prasad et al. | |
| 2013/0055117 A1 | 2/2013 | Sahibzada et al. | |
| 2014/0136944 A1 | 5/2014 | Harris et al. | |
| 2015/0095763 A1 | 4/2015 | Wang et al. | |
| 2016/0170953 A1 | 6/2016 | Maddali et al. | |

(Continued)

FOREIGN PATENT DOCUMENTS

WO 2016142571 A1 9/2016

OTHER PUBLICATIONS

International Application No. PCT/US2021/031784, International Search Report and Written Opinion dated Aug. 3, 2021, 22 pages.

(Continued)

*Primary Examiner* — Eric J. Bycer
(74) *Attorney, Agent, or Firm* — Haynes and Boone, LLP

(57) ABSTRACT

Methods and systems are presented for automatically verifying online content for different device configurations and/or account configurations. A request for verifying a user interface software workflow is received from a device. The request can specify particular parameters and content to see if that content appeared correctly when presented to users. Session data associated with one or more real-world user interaction sessions between user devices and a service provider server is obtained. The session data is used to generate data representing how one or more user interface elements are rendered on one or more user devices during the one or more real-world user interaction sessions. The data is comparable against benchmark data to determine if content was correctly presented. Reporting data can be made available that indicates if the user interface workflows are operating correctly.

20 Claims, 6 Drawing Sheets

(56) References Cited

U.S. PATENT DOCUMENTS

| | | |
|---|---|---|
| 2017/0323026 A1 | 11/2017 | Le Bras et al. |
| 2018/0068126 A1 | 3/2018 | Biswas et al. |
| 2018/0203786 A1 | 7/2018 | Marron et al. |
| 2018/0329813 A1 | 11/2018 | Hamid et al. |
| 2020/0026502 A1 | 1/2020 | Moore et al. |

OTHER PUBLICATIONS

International Preliminary Report on Patentability for Application No. PCT/US2021/031784, dated Nov. 24, 2022, 10 pages.

AUTOMATED VERIFICATION OF USER INTERFACE PROCESS FLOWS

CROSS REFERENCE TO RELATED APPLICATION

The present invention is a Continuation of U.S. patent application Ser. No. 15/931,322, filed May 13, 2020, now U.S. Pat. No. 11,521,210, which is incorporated herein by reference in its entirety.

BACKGROUND

The present specification generally relates to online user interface verification, and more specifically, to detecting anomalies in online user interface workflows that are rendered on various computing platforms according to various embodiments of the disclosure.

Related Art

One of the benefits of providing an online user interface for is that the user interface (e.g., including content displayed via one or more computer software programs) can be modified and updated without requiring much (or any) modifications to a client-side device. For example, an online service provider may change content and/or workflows by updating programming code stored on a server associated with the online service provider. When a user device accesses content associated with the online service provider, the updated programming code or other content may be downloaded to the user device. As a result, the changed content and/or workflows may be automatically rendered on the user device based on the updated programming code or other content without requiring any changes to the user device.

Whenever an online service provider provides new content/workflows or updates existing content/workflows, it may be desirable to verify that the new or updated content/workflows are rendered as intended for different users. However, with so many different possible types of devices used by the users to access online content (e.g., computers with different combinations of processor types, operating systems, and web browsers, mobile devices with different combinations of processors, screen sizes, operating systems, and web browsers, etc.) and different account settings (e.g., geographical locations, account configurations, etc.) used for accessing the online content, it is a challenge for the online service provider to verify the rendering of the content and/or workflows for all users (who may have different combinations of configurations). Thus, the applicant recognizes that there is a need for accurately and efficiently verifying rendering of online content for different user accounts.

Figure 1:
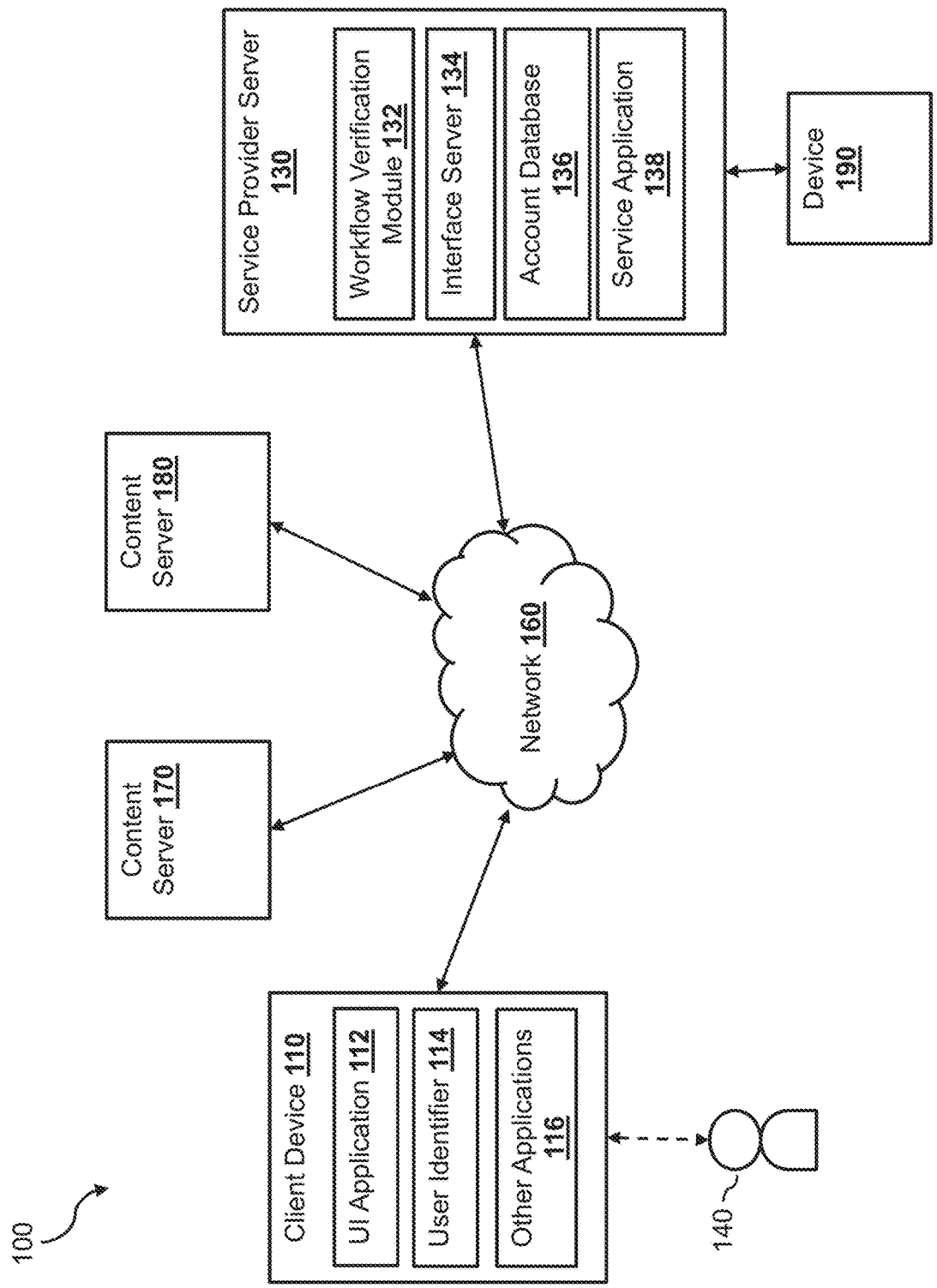
FIG. 1 is a block diagram illustrating an online service provider system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for automatically verifying renderings of online content for different device configurations and/or account configurations. With many different types of devices, account settings, and countless other parameters (e.g., country/geographical locations, display languages, other user information, etc.), it can be a challenge to verify that online content is rendered correctly across different user devices configurations and/or account configurations. Note that as used throughout this disclosure, references may be made to device and/or (user) account configurations. These configurations should be understood to encompass additional information, as discussed above, in various embodiments (e.g., it may be any information related to a user, a user account, and/or a user device).

In one approach to content/interface verification, an online service provider might generate simulated renderings of online content based on different configurations. For example, the online service provider may use different simulators (where each simulator mimics behavior associated with a particular type of device and/or a particular type of account configuration, such as a user account based in Brazil having three financial payment sources using an Apple® iPhone® with a Safari® web browser) to access the online content of the online service provider (e.g., retrieving web content from a web server, retrieving mobile application user interface content from an application server, etc.). The online service provider may then verify whether the online content is rendered correctly on the different simulators (e.g., determining whether the rendered online content corresponds to a predetermined rendering of the online content).

However, verification of online content rendering via simulations has many drawbacks. First, it is difficult to take into account all of the different possible combinations of device configurations and account configurations (the number of different possible combinations may be in the hundreds, thousands, or even more). The simulators used by the online service provider may not account for at least some combinations of the device configurations and account configurations, and thus, may not be able to comprehensively verify the renderings of the online content on all user devices. Second, the simulations may reduce the performance of the live production environment. As discussed above, the online service provider may perform a large amount of simulations of rendering online content to account for the different device and account configuration settings. Since the simulations may access the online content in a live production environment (e.g., retrieving the online content from a production web server or a production application server, etc.), the simulations may cause additional traffic to the production servers of the online service provider, which may in turn, lead to slower response time for the service provider server in servicing real users.

Thus, according to various embodiments of the disclosure, a workflow verification system may be configured to automatically verify rendering of a user interface software workflow based on one or more real-world user interaction sessions between real world users and the online service provider. Unlike performing simulations of renderings of user interface software workflow, the workflow verification system tracks and records real-world user interaction sessions between user devices and the online service provider. The real-world user interaction sessions with the online service provider are not artificially simulated interaction sessions. Instead, these sessions are recordings of real-world users interacting with a service provider server of the online service provider via their user devices for performing an online action (such as one or more electronic transactions through one or more user accounts of the online service provider).

The online service provider may perform different types of transactions for users. Using an example in which the online service provider is an electronic payment service provider, the different types of transactions offered to users may include a login transaction (e.g., for enabling a user to log in to a user account), a balance viewing transaction (e.g., for viewing a balance of the user account), an electronic payment transaction (e.g., for performing an electronic payment transaction to another user account), a fund withdrawal transaction (e.g., for withdrawing funds from the user account to another bank account associated with the user), etc.

In some embodiments, the online service provider may facilitate one or more of these transactions with the users via an online interface (e.g., a web interface such as a website, a mobile application interface, etc.) through a series of steps (referred to herein as "a user interface software workflow"). The series of steps may be associated with a series of interfaces (e.g., a series of webpages, a series of changes on a webpage, a series of different mobile application interfaces, etc.) that is presented to a user on a user device in a specific order for facilitating a corresponding transaction. Thus, each of the transactions may be associated with a particular user interface software workflow. For example, the login transaction may be associated with a login workflow, which may include presenting an account login user interface on a user device, receiving account credentials via the account login user interface, and presenting a user account home user interface or an account access denial user interface based on the account credentials received via the account login user interface.

The balance viewing transaction may be associated with a balance viewing workflow, which may include presenting a user account home user interface that includes a user interface element (e.g., a button) for triggering a balance viewing transaction and upon receiving a selection of the user interface element, presenting a balance of the user account on a balance viewing user interface.

The electronic payment transaction may be associated with a payment transaction workflow, which may include presenting a user account home user interface that includes a user interface element (e.g., a button) for triggering an electronic payment transaction, upon receiving a selection of the user interface element, presenting a payment transaction initiation user interface, receiving parameters associated with the electronic payment transaction (e.g., an account identifier associated with a payee, an amount, a purpose for the electronic payment transaction, etc.) via the payment transaction initiation user interface, and presenting a payment transaction confirmation user interface when the electronic payment transaction is authorized or a payment transaction denial user interface when the electronic payment transaction is denied.

The fund withdrawal transaction may be associated with a withdrawal transaction workflow, which may include presenting a user account home user interface that includes a user interface element (e.g., a button) for triggering a fund withdrawal transaction, upon receiving a selection of the user interface element, presenting a fund withdrawal initiation user interface, receiving parameters associated with the fund withdrawal transaction (e.g., an account identifier associated with an external bank account, an amount, etc.) via the fund withdrawal transaction initiation user interface, and presenting a fund withdrawal transaction confirmation user interface when the fund withdrawal transaction is authorized or a withdrawal transaction denial user interface when the fund withdrawal transaction is denied.

In some embodiments, the workflow verification system may receive a request for verifying a particular user interface software workflow. These requests can be targeted, with various search parameters, to perform specific testing using real-world user sessions. Thus, the request may be received from a device associated with an agent of the online service provider (e.g., a software developer, a product manager, etc.). The request may specify which user interface software workflow among multiple different user interface software workflows for verification. In addition to specifying a user interface software workflow, the request may also specify a set of configuration criteria associated with user devices and/or user accounts that are involved with the real-world user interaction sessions. The set of configuration criteria may include a set of device configurations that specify one or more combinations of device attributes used to interact with the service provider server, which may include a device type (e.g., a desktop, a mobile device, etc.), a processor type (e.g., a 64-bit processor, a 32-bit processor, etc.), an operating system type (an iOS® operating system, a Mac® operating system, a Windows® operating system, an Android® operating system, etc.), a web browser type (a Safari® web browser, an Internet Explorer web browser, a Google® Chrome® web browser, etc.), a display size or resolution, or other device attributes. The set of configuration criteria may include a set of account configurations that specify one or more combinations of account attributes, which may include a geographical location associated with a user account, a privacy setting associated with a user account, a risk level associated with a user account, a balance associated with a user account, or other account attributes. Various other information may be specified as well—any information related to a user, a user account, and/or a user device. The set of configuration criteria may also include a set of transaction configurations that specify one or more combinations of transaction attributes, which may include a risk associated with a user account involved in a transaction, a minimum or maximum amount associated with the transaction, or a geographical region associated with the transaction.

Based on the set of configuration criteria, the workflow verification system may obtain one or more real-world user interaction sessions with the service provider server that satisfy the set of configuration criteria. In some embodiments, the workflow verification system may record some or all of real-world user interaction sessions conducted by different users with the service provider server. For example, the workflow verification system may begin recording a real-world user interaction session whenever a user is accessing an online software service. Thus, the recording can occur when a user is initiating a transaction (e.g., accesses a log in screen, initiating an electronic payment transaction request from a home screen, initiating a fund withdrawal request from a home screen, etc.). The recording may include obtaining and storing data associated with the real-world user interaction session, which may include request data representing online content requests submitted by a user device of a real-world user to the service provider server (e.g., a hypertext transfer protocol (HTTP) request, a request under REST API protocol, etc.), programming code that is transmitted by the service provider server to the user device for providing a corresponding user interface software workflow during the real-world user interaction session (e.g., web content such as HTML code, JavaScript®, other types of user interface content, etc.) (typically in response to the online content requests), and rendering data representing how one or more user interfaces within the user interface software workflow is rendered on the user device.

In some embodiments, the real-world user interaction sessions are recorded before receiving the request. For example, the workflow verification system may have a policy or setting that records all (or some) of the real-world user interaction sessions whenever they occur. The recordings may be stored in a database and can be searched by the workflow verification system in response to receiving a verification request. In some embodiments, the workflow verification system may be configured to begin recording real-world user interaction sessions based on the request. For example, upon receiving the request, the workflow verification system may start recording real-world user interaction sessions that satisfy the set of configuration criteria for a duration (e.g., for a week, a month, etc.).

As discussed herein, different device configurations and/or different account configurations (including any information related to a user, a user account, and/or a user device) may cause a user interface to be rendered differently. Thus, when the same programming code is transmitted to different devices, the different devices may render (e.g., display) the user interface differently based on different device configurations and/or different account configurations (e.g., different operating systems, different display sizes, different geographical locations associated with the user accounts, etc.). Thus, when recording the real-world user interaction session, the workflow verification system may obtain, from the user device, rendering data that represents how user interfaces within the real-world user interaction session are actually rendered on the user device.

In some embodiments, the rendering data may include a data structure (e.g., a document object model (DOM) tree) representing how online content is being rendered on the user device. The rendering data may enable the workflow verification system (or other systems) to re-generate an appearance (e.g., a screenshot) of the rendered user interfaces within the real-world user interaction session. Based on the online content requests and the rendering data (e.g. the DOM tree), the workflow verification system may determine a series of interactions with the user interfaces (e.g., selections of one or more user interface elements on the user interfaces, etc.) and a series of user interfaces (e.g., webpages, screens, etc.) that are presented to the user on the user device.

In one example, the rendering data may indicate that a user accesses a login page of the online service provider (e.g., based on an HTTP request submitted to the online service provider from a user device, etc.), a login page that is rendered on the user device, credentials received by the online service provider via the login page (e.g., based on another HTTP request submitted to the online service provider), and a user account home page rendered on the user device upon authenticating the user.

In some embodiments, at least part of the series of interactions may occur within the user device locally without interactions with the service provider server (e.g., interactions between the user and the user interface presented on the user device). For example, the programming code that is transmitted by the service provider server to the user device may include interactive objects that may change the appearance of the user interface automatically based on user interactions with the user interface (e.g., scrolling, modifications to a frame within a page, etc.) without requiring any communication with the service provider server. Thus, the rendering data obtained from the user device may also include one or more changes to the rendering data (e.g., changes to the DOM tree) while the user interface corresponding to the DOM tree is presented on a user device. Thus, any local interactions with the user interface that cause a change of the appearance of the user interface may also be recorded.

The workflow verification system may store the recordings of the real-world user interaction sessions in a database. It is noted that the workflow verification system may identify and redact sensitive data (e.g., personal identifiable data, health data, financial data, etc.) before storing the recordings in the database, as will be explained in more detail below. In some embodiments, after each real-world user session (e.g., after a transaction has been completed for the user), the workflow verification system may extract metadata from the real-world user interaction session (e.g., the type of transaction being performed, device attributes associated with the user device used to interact with the service provider server, account attributes associated with the user account associated with the transaction, etc.) and store the metadata in association with the recording of the real-world user session in the database. The metadata that is stored in association with the recording may allow the workflow verification system to search the database more quickly.

In some embodiments, upon receiving and processing the request for verifying a particular user interface software workflow, the workflow verification system may interpret the parameters of the request and may then search the database (e.g., send one or more queries against the database) for recordings of one or more real-world user interaction sessions associated with the particular user interface software workflow based on the set of configuration criteria. In some embodiments, the workflow verification system may start recording real-world user interaction sessions associated with the particular user interface software workflow based on the set of configuration criteria upon receiving the request. The one or more real-world user interaction sessions may correspond to the particular user interface software workflow specified in the request (e.g., a payment transaction workflow, a fund withdrawal workflow, etc.), may be conducted by user devices that satisfy the set of device configurations within the set of configuration criteria, and may be conducted through user accounts that satisfy the set of account configurations within the set of configuration criteria.

Once the workflow verification system obtains the one or more real-world user interaction sessions, the workflow verification system may generate, for each of the one or more real-world user interaction sessions, a playback of the real-world user interaction session to determine if an anomaly exists in the playback of the real-world user interaction session. In some embodiments, the workflow verification system may generate the playback of the real-world user interaction session based on the content request(s) sent by the user device to the service provider server and the rendering data representing how one or more user interfaces within the user interface software workflow is rendered on the user device. For example, the workflow verification system may generate a playback of the real-world user interaction session based on the recording. The playback may include a series of user interfaces and interactions in a chronological order based on the request data and the rendering data from the recording. In some embodiments, the workflow verification system may verify whether the rendering of the series of user interfaces within the real-world user interaction session corresponds to a predetermined rendering of the user interfaces (e.g., whether the rendering of the series of user interfaces within the real-world user interaction session deviates from the predetermined rendering of the user interfaces).

In some embodiments, the workflow verification system may receive data representing the predetermined rendering of the user interfaces as part of the request from the agent of the online service provider (e.g., one or more DOM trees representing how the user interfaces in the user interface software workflow should be rendered, images representing screenshots of how the user interfaces should be rendered, etc.). In some embodiments, the workflow verification system may determine the predetermined rendering of the user interfaces based on the recording itself. For example, the workflow verification system may generate benchmark rendering data representing how the user interfaces are supposed to be rendered on the user device based on the programming code that was transmitted from the service provider server to the user device during the real-world user interaction session and the attributes of the user device (e.g., the device configuration and the account configuration).

In some embodiments, the workflow verification system may generate DOM tree(s) based on the benchmark rendering data. As such, the workflow verification system may compare the DOM tree(s) representing how the user interfaces were actually rendered during the real-world user interaction session and the DOM tree(s) (e.g., benchmark DOM tree(s)) representing the benchmark rendering data.

In some embodiments, the workflow verification system may receive (or generate from the DOM tree(s) generated based on the benchmark rendering data) one or more benchmark screenshot(s) representing how one or more user interfaces within the user interface software workflow should appear, for example, as part of the request for verifying the user interface software workflow. The workflow verification system may generate one or more rendered screenshots based on the rendering data of the recording (e.g., based on the DOM tree(s)) and may compare the rendered screenshot(s) to the one or more benchmark screenshots. Since the rendered screenshot(s) and the benchmark screenshot(s) are digital images, the workflow verification system may perform pixel analysis to compare the rendered screenshot(s) and the benchmark screenshot(s) to detect any differences between the screenshots.

By comparing the DOM trees or the screenshots, the workflow verification system may detect whether the rendered user interface(s) within the real-world user interaction session deviates from predetermined rendering (e.g., a benchmark rendering) of the user interface(s). The deviations (anomalies) detected by the workflow verification system may include at least one of the following: (1) a missing content (e.g., an image, an advertisement, a piece of writing, etc.) in the actual rendering of a user interface during the real-world user interaction session, (2) a shift in location of a content on the actual rendering of the user interface during the real-world user interaction session, (3) incorrect content (e.g., the content appears differently such as different color or different shape, additional content that was not included in the benchmark rendering, etc.) appears on the actual rendering of the user interface during the real-world user interaction session, or (4) other types of differences between the actual rendering and the benchmark rendering of the user interfaces.

After reviewing and analyzing all of the obtained real-world user interaction sessions, the workflow verification system may send information (e.g., a report) to a device (e.g., a device of the agent). The information may indicate whether the user interface software workflow is verified (e.g., the user interfaces in all of real-world user interaction sessions match the benchmark rendering data). When a deviation is detected between any one of the real-world user interaction sessions and the benchmark data, the workflow verification may provide information related to the deviation to the device (e.g., a percentage of the sessions that complies with or deviates from the rendering data, device and/or account attributes associated with the sessions that deviate from the rendering data, etc.). In some embodiments, the report may include a rendered screenshot of a user interface that deviates from a benchmark rendering of the user interface. The report may also include the attributes of the device or the account involved in the real-world user interaction session (e.g., the device configurations, the account configurations, etc.).

Furthermore, in some embodiments, upon receiving a request by the agent (e.g., through a selection of user selectable element on the report), the workflow verification system may present a rendering of a playback of the real-world user interaction session. For example, the workflow verification system may render all of the user interfaces that were rendered on the user device during the real-world user interaction session based on the rendering data, and may present the rendered user interfaces in a chronological order. In some embodiments, based on the online content request data, the workflow verification system may infer interactions of the user with the user interfaces (e.g., which actions the user has performed on the user interfaces such as clicking a button, scrolling a page or a frame within a page, dragging an object on a user interface, etc.). The sequence of the user interactions in addition to the progression of rendered user interfaces may form the playback (similar to a video clip of reenacting the real-world user interaction session). In some embodiments, the workflow verification system may identify sensitive data (e.g., data protected from public or unauthorized access, personal identification information such as names, social security numbers, birthdates, passwords, etc., financial information, such as account numbers, health information, etc.) and may redact the sensitive data from the rendering of the user interfaces before presenting the screenshot(s) and/or the playback of the real-world user interaction session on the device of the agent.

By using real-world user interactions with the service provider server to detect anomalies (e.g., deviations from benchmark rendering) in the rendering of user interface(s)

associated with a user interface software workflow, the workflow verification system may verify the rendering of user interfaces using real-world examples based on attributes (e.g., device configurations, account configurations, etc.) associated with real-world users. Since the real-world users represent a variety of combinations of attributes, the scenarios covered by the workflow verification system is more comprehensive and representative of the configurations used by real-world users than conventional simulation-based testing. Furthermore, since no additional traffic is introduced in the detection of rendering anomalies, the performance of the service provider server is not reduced by the verification process.

FIG. 1 illustrates a system 100, within which the workflow verification system may be implemented according to one embodiment of the disclosure. The system 100 includes a service provider server 130, a client device 110, and content servers 170 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The client device 110, in one embodiment, may be utilized by a user 140 to interact with the service provider server 130 and/or the content servers 170 and 180 over the network 160. For example, the user 140 may use the user device 110 to conduct online transactions with the service provider server 130 via a website hosted by a web server (e.g., a web server 134) associated with the service provider server 130. The user 140 may log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The client device 110, in one embodiment, includes a user interface application 112 (e.g., a web browser, a mobile application associated with the service provider server 130, etc.), which may be utilized by the user 140 to conduct electronic transactions (e.g., online payment transactions, etc.) and/or communicate with the service provider server 130 over the network 160. In one implementation, the user interface application 112 includes a browser module that provides a network interface to browse information available over the network 160 using a protocol such as an HTTP protocol. For example, the user interface application 112 may be implemented, in part, as a web browser to view information available over the network 160. In another embodiment, the user interface application 112 includes a client application (e.g., a mobile application) associated with the service provider server, and may provide a network interface to retrieve content and other data over the network 160 using a protocol such as a REST API, SOAP.

The client device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications.

The client device 110, in one embodiment, may include at least one identifier 114, which may be implemented, for example, as operating system registry entries, cookies associated with the user interface application 112, identifiers associated with hardware of the client device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the client device 110 to provide user information with a transaction request, such as a login request, a fund transfer request, a request for adding an additional funding source (e.g., a new credit card), or other types of request. The user information may include user identification information.

Even though only one client device 110 is shown in FIG. 1, it has been contemplated that one or more client devices (each similar to client device 110) may be communicatively coupled with the service provider server 130 and the content servers 170 and 180, and may interact with the service provider server 130 via the network 160 within the system 100.

The service provider server 130, in one embodiment, may be maintained by an online service provider, which may provide online transaction services for the user 140 of user device 110. As such, the service provider server 130 may include a service application 138, which may be adapted to interact with the user device 110 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content (e.g., webpages) in response to HTTP requests. In another example, the interface server 134 may include an application server configured to interact with a corresponding application (e.g., a service provider mobile application) installed on the user device 110 via one or more protocols (e.g., REST API, SOAP, etc.). As such, the interface server 134 may include pre-generated electronic content ready to be served to users. At least some of the pages (e.g., webpages) served to users are associated with electronic transactions (e.g., user interfaces associated with different user interface software workflows). For example, the interface server 134 may store a log-in page (e.g., log-in webpage) and is configured to serve the log-in page to users for logging into user accounts of the users to access various service provided by the service provider server 130 (as part of the login transaction workflow). The interface server 134 may also store one or more payment pages (e.g., payment webpages) and is configured to serve the payment pages to users for conducting electronic payment transactions (as part of the payment workflow). As a result, a user may access a user account associated with the user and access various electronic services offered by the service provider server 130, by generating HTTP requests (or other types of requests) directed at the service provider server 130. In response to receiving the requests (e.g., the HTTP requests), the interface server 134 may serves (e.g., transmits) programming code associated with the user interfaces to the user device 110. The user device 110 may render the user interfaces on a display screen of the user device 110 based on the programming code. In some embodiments, at least part of the content being served to the user device 110 (e.g., advertisement content, multi-media content, etc.) includes content retrieved from content servers 170 and/or 180. Thus, the programming code transmitted to the user device 110 may cause the user device 110 to retrieve the additional content (e.g., the advertisement content, the multi-media content, etc.) from the content servers 170 and/or 180 to display on the display screen of the user device 110.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

The service provider server 130 also includes a workflow verification module 132 that implements the workflow verification system as disclosed herein. The workflow verification module 132 may receive a request corresponding to a verification of a particular user interface software workflow (e.g., a login workflow, a payment workflow, etc.). The request may be received from a device 190 associated with an agent of the online service provider (e.g., a software developer or a product manager associated with any software products implemented within the service provider server 130, etc.). For example, the agent may desire to verify that a recently implemented change/update to an existing workflow (e.g., a new content, a change of content, a change of steps in the workflow, etc.) is rendered correctly on user devices (e.g., the user device 110) that interact with the service provider server 130. However, since user interfaces may be rendered differently on different devices based on different device configurations and/or different account configurations as discussed herein, it can be challenging to verify that the user interfaces and workflow are rendered correctly in devices with all different combinations of attributes. Thus, the agent may use the device 190 to submit a request for verifying the particular user interface software workflow.

The request may specify a particular user interface software workflow. Furthermore, the request may specify a set of configuration criteria that may include device configurations and/or account configurations (any information related to a user, a user account, and/or a user device). For example, the agent may desire to verify the rendering of the particular user interface software workflow (e.g., a payment workflow, etc.) on devices used by users in a particular geographical region (e.g., Brazil, China, Germany, etc.). Thus, the agent may submit a request to the workflow verification module 132 for verifying renderings of the particular user interface software workflow on devices that satisfy the criteria of being located in Brazil. In another example, the agent may desire to verify the rending of the particular user interface software workflow on a particular device type (e.g., Android® phones, etc.). The agent may then submit a request to the workflow verification module 132 for verifying renderings of the particular user interface software workflow on devices that satisfy the criteria of being an Android® mobile device.

Upon receiving the request, the workflow verification module 132 may retrieve (or otherwise obtain) recordings of one or more real-world user interaction sessions conducted by one or more user devices (e.g., the user device 110, etc.) with the service provider server 130 that satisfy the set of configuration criteria (e.g., conducted by devices that satisfy the device configurations, conducted through user accounts that satisfy the account configurations, etc.). The real-world user interaction sessions may be conducted by user devices and through user accounts to perform one or more electronic transactions, where the one or more electronic transactions have real-world effect on the user accounts (e.g., money being transferred from a user account to another user account, etc.).

The workflow verification module 132 may compare rendering data representing how the user interfaces in the workflow are rendered on the user device during the one or more real-world user interactions sessions against benchmark renderings, and detect a deviation when there is a difference between the actual renderings of the user interfaces and the benchmark renderings. The workflow verification may transmit a report indicating the deviation to the device 190.

Figure 2:
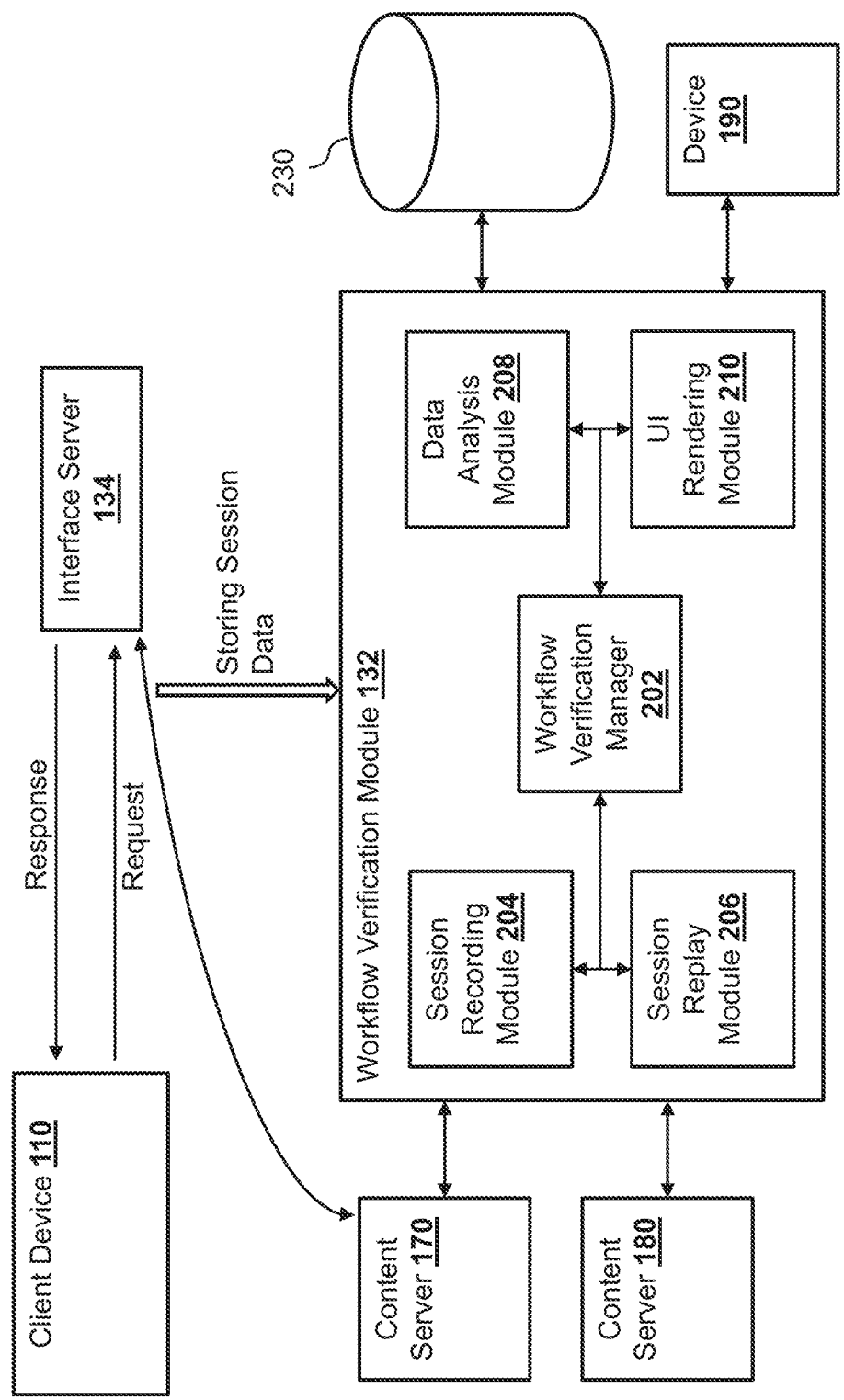
FIG. 2 is a block diagram illustrating a workflow verification module according to an embodiment of the present disclosure.

FIG. 2 illustrates a block diagram of the workflow verification module 132 according to various embodiments of the disclosure. The workflow verification module 132 includes a workflow verification manager 202, a session recording module 204, a session replay module 206, a data analysis module 208, and a user interface (UI) rendering module 210. These modules may be implemented as executable computer instructions in various embodiments. In some embodiments, the session recording module 204 may be configured to record session data of real-world user interaction sessions with the service provider server 130. For example, when the workflow verification manager 202 detects that a user device (e.g., the user device 110) has started an interaction session with the service provider server 130 (e.g., the interface server 134 receiving a request, such as an HTTP request, from the user device 110, etc.), the session recording module 204 may begin recording data associated with the session. In some embodiments, the session recording module 204 may record data associated with the real-world interaction session, including data representing online content requests submitted by the user device 110 of the user 140 (a real-world user of the service provider server 130) (e.g., a hypertext transfer protocol (HTTP) request, a request under REST API protocol, etc.), programming code that is transmitted by the service provider server 130 to the user device for providing a corresponding user interface software workflow during the real-world user interaction session (e.g., web content such as HTML code, JavaScript®, other types of user interface content, etc.) (typically in response to the online content requests), and rendering data representing how one or more user interfaces within the user interface software workflow is rendered on the user device. For example, during the real-world user interaction session, the session recording module 204 may obtain, from the interface server 134, the online content requests transmitted from the user device 110 to the interface server 134 and programming code that the interface server 134 transmitted to the user device 110 in response to the online content requests.

As discussed herein, different device configurations and/or different account configurations may cause a user interface to be rendered on a user device differently from other user devices. When the same programming code is transmitted to different devices, different devices may render (e.g., display) the user interface differently based on different device configurations and/or different account configurations (e.g., different operating systems, different display sizes, different geographical locations associated with the user accounts, etc.). Thus, to determine how user interfaces (e.g., webpages, etc.) are rendered on the user device 110, the session recording module 204 may obtain, from the user device 110, rendering data representing how user interfaces are actually rendered on the user device 110 based on the programming code.

In some embodiments, the session recording module 204 may obtain the rendering code (e.g., HTML code) used for rendering by the user interface application 112 for rendering the interface. The rendering code may be different from the programming code that is transmitted from the service provider server 130 because as the programming code is executed by the user interface application 112, at least part of the programming code (e.g., JavaScript® or other executable code) may cause the user interface application 112 to modify, insert, or remove certain portion of the code before the code is being rendered by the user interface application 112. For example, the programming code may include conditional code that causes the user interface application 112 to render the user interface on the user device 110 based on different rendering code. The conditional code may be associated with a device configuration (e.g., screen size, operating system, application type of the user interface application 112, etc.), associated with an account configuration (e.g., a geographical location associated with a user account of the user 140, a privacy setting of the user account, a risk level of the user account, etc.), or other factors. In some embodiments, the programming code from the service provider server 130 may cause the user interface application 112 to retrieve additional content (e.g., additional displayable content, additional programming code) from an external source (e.g., the content servers 170 and/or 180) before rendering the code. Thus, the rendering code may include only a selective portion of the programming code and/or may include additional code from external sources. Since the user interface that is rendered on the user device 110 can only be determined based on the rendering code used by the user interface application 112 (after the user interface application 112 executes the programming code and applies modifications, additions, and/or removals of the code), the session recording module 204 may obtain, from the user device 110, the rendering data (e.g., the rendering code). In some embodiments, the programming code transmitted from the service provider server 130 to the user device 110 may include executable code that causes the user interface application 112 to automatically transmit the rendering code to the session recording module 204.

In some embodiments, at least part of the series of interactions may occur within the user device 110 locally without interactions with the service provider server 130. For example, the programming code that is transmitted by the service provider server 130 to the user device 110 may include interactive objects that may change the appearance of the user interfaces automatically based on user interactions with the user interface (e.g., scrolling, modifications to a frame within a page, etc.) without requiring any communication between the user device 110 and the service provider server 130. Thus, the session recording module 204 may also obtain, as part of the rendering data from the user device 110, one or more changes to the rendering code while the user interface is presented on a user device 110.

The session recording module 204 may store the session data associated with the real-world user interaction session in a database 230. In some embodiments, to reduce the amount of data storage for storing the session data in the database 230, the session recording module 204 may convert the rendering code to abstract data that may represent the rendering code. In some embodiments, the abstract data may include a data structure (e.g., a document object model (DOM) tree) representing how a user interface is being rendered on the user device 110. The rendering data may also include any changes to the DOM tree based on local interactions between the user 140 and the user interface being presented on the user device 110. The rendering data may enable the workflow verification module 132 (or other systems) to re-generate an appearance (e.g., a screenshot) of the user interfaces rendered by the user device 110 during the real-world user interaction session.

In some embodiments, the session recording module 204 may detect that the real-world user session is terminated. For example, the session recording module 204 may determine that the real-world user session is terminated when the user 140 logs out of a user account with the service provider server 130, when the user 140 closes (or quits) the user interface application 112, or when an electronic transaction initiated by the user 140 with the service provider server 130 has completed. When the real-world user session is terminated, the session recording module 204 may extract metadata from the real-world user interaction session (e.g., the type of transaction being performed, device attributes associated with the user device 110 used to interact with the service provider server 130, account attributes associated with the user account associated with the transaction, etc.) and store the metadata in association with the recording of the real-world user session in the database 230. The metadata that is stored in association with the recording may allow the workflow verification module 132 to quickly search the database 230.

The session recording module 204 may record different real-world user interaction sessions conducted by different devices through different user accounts with the service provider server 130 over a period of time (e.g., a day, a year, 5 years, or any other period of time). By recording different real-world user interaction sessions conducted over the period of time, the workflow verification module 132 is able to obtain session data associated with real-world user interaction sessions conducted by different combinations of device configurations (e.g., different types of devices, different operating systems, etc.) and through different account configurations (e.g., different geographical regions, different risk levels, etc.). The combinations of device configurations and account configurations associated with these recordings represent realistic combinations that are used in real-world cases (e.g., actually used by users of the service provider server 130), instead of combinations that are decided by simulators. Furthermore, these real-world user interaction sessions are conducted by actual users of the online service providers to perform transactions with the service provider server 130 that have real-world effects (e.g., funds being withdrawn, funds being transferred between different user accounts, etc.).

Figure 3:
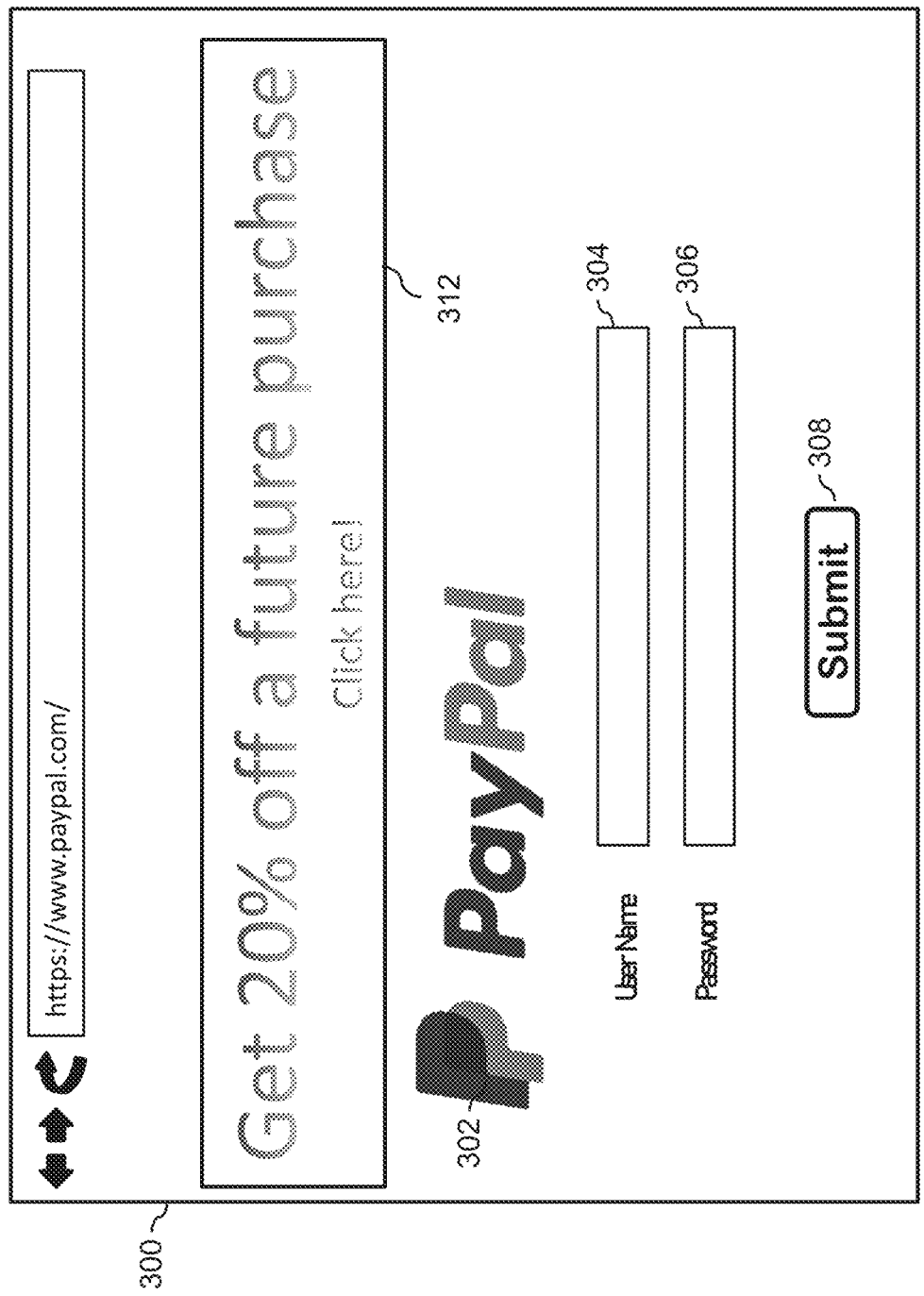
FIG. 3 illustrates a rendering of a user interface during a real-world user interaction session according to an embodiment of the present disclosure.

The workflow verification module 132 may receive a request for verifying a particular user interface software workflow, for example, from the device 190 associated with an agent of the online service provider. For example, new content may be added into the particular user interface software workflow (e.g., a login transaction workflow), and the agent desires to verify that the new content is rendered correctly in different devices. FIG. 3 illustrates an example of an update to a login transaction workflow. In this example, new content 312 (e.g., an advertisement) is added to a login screen 300 (e.g., a login webpage) within the login transaction workflow.

Thus, the request submitted to the workflow verification module 132 may specify that it is a request for verifying that the new content 312 is rendered and appears on the login screen 300 correctly in different device configurations and account configurations. When the request does not specify any device configurations and account configurations, the workflow verification module 132 may verify the workflow (e.g., the login transaction workflow) on recorded sessions across all combinations of device configurations and account configurations. In some embodiments, the request may also specify a set of configuration criteria, which may include one or more device configurations (e.g., Apple® mobile devices, Android® mobile devices, etc.) and/or one or more account configurations (e.g., accounts associated with Germany and China, accounts with risk level above a threshold, etc.). In such events, the workflow verification module 132 may be configured to verify the workflow only on recorded sessions associated with devices and/or accounts that satisfy the configurations criteria.

Upon receiving the request for verifying the particular user interface software workflow (e.g., the login transaction workflow), the workflow verification manager 202 may interpret the request by processing one or more parameters specified in the request. Upon processing, the workflow verification manager 202 may search the database 230 (e.g., initiate one or more queries against the database 230) for recordings of one or more real-world user interaction sessions associated with the particular user interface software workflow based on the set of configuration criteria. The parameters specified in the verification request may allow deeply customized and targeted testing to be performed. The parameters can include time period, country, device type, user account information, and many other types of data. The request may also identify one of many different workflows, e.g., by identifying a URL involved in the workflow, or by means of some other identifier. Thus, it may be the case that a workflow was modified and put into place at 12:00 am on Jul. 1, 2019. This modified workflow might require that all electronic purchases made in Great Britain display particular new content on the payment checkout screen for mobile devices if the user is paying by debit card and the transaction amount is greater than 25 Pounds Sterling, immediately before a user completes their monetary transaction. In this case, the request could specify, among other parameters, (1) the identity of the workflow (2) require that the user account have a home address in Great Britain or the device IP/location was in Great Britain, (3) that the funding instrument selected by the user is a debit card, (4) that the transaction amount is more than 25 Pounds Sterling, and (5) that the user device is running the Android™ operating system or the iOS™ operating system (the two predominant mobile smartphone operating systems), and a minimum limit of 100 total playbacks and a maximum limit of 500 total playbacks. These parameters would then be translated into one or more database queries to fetch the appropriate playback data.

The workflow verification manager 202 may obtain, from the many different recordings of real-world user interaction sessions stored in the database 230, a subset of recordings of real-world user interaction sessions that is associated with the login transaction workflow and that satisfies the set of configuration criteria. The subset of recordings may be associated with real-world user interactions sessions conducted within a time threshold (e.g., the past day, the past week, the past month, etc.). In some embodiments, in response to receiving the request, the workflow verification manager 202 may configure the session recording module 204 to start recording real-world user interaction sessions that are associated with the particular user interface software workflow and that satisfy the set of configuration criteria.

The recordings obtained by the workflow verification module 132 may represent real-world user interaction sessions conducted within the time threshold, and may be conducted through different devices and through different user accounts. For example, the recordings may include a first recording of a first real-world user interaction session conducted by a first user using a first device (e.g., a desktop running Windows® operating system and Google® Chrome® web browser) through a first user account (e.g., having a home address in Brazil). The recordings may also include a second recording of a second real-world user interaction session conducted by a second user using a second device (e.g., an iPhone® running iOS® operating system and Safari® web browser) through a second user account (e.g., having a home address in Germany).

Once the workflow verification manager 202 obtains the real-world user interaction sessions, the data analysis module 208 may detect, for each of the real-world user interaction sessions, whether an anomaly exists in one or more user interfaces rendered during the real-world user interaction session. In some embodiments, the data analysis module 208 may detect the anomaly by comparing rendering data representing what was rendered on the user device during the real-world user interaction session and benchmark data. The benchmark data may be provided by the device 190, and may come in the form of rendering code, an abstract data structure such as a DOM tree, or an image (e.g., a screen shot). The data analysis module may compare the rendering data with the benchmark data to determine any differences (e.g., any different above a threshold, etc.). In some embodiments, the data analysis module 208 may automatically generate the benchmark data based on the session data in the recording, specifically, the portion of the session data representing the programming code that was transmitted from the service provider server 130 to the user device during the real-world user interaction session. The data analysis module 208 may generate a DOM tree or render a screenshot for a user interface based on the programming code and the configurations (e.g., the device configurations and account configurations) indicated in the metadata of the recording.

In one example where the benchmark data includes a DOM tree, the data analysis module 208 may compare a DOM tree stored in the recording representing a rendering of a user interface on the user device during the real-world user interaction session against the benchmark DOM tree. In another example where the benchmark data includes a screenshot, the data analysis module 208 may use the user interface rendering module 210 to render a screenshot of the user interface based on the rendering data (e.g., the DOM tree) stored in the recording, and may compare the screenshot against the benchmark screenshot. In some embodiments, the data analysis module 208 may compare all of the user interfaces that were rendered during the real-world user interaction session against the benchmark user interfaces to determine whether there is any difference between any pairs of corresponding user interfaces. In some embodiments, the request may identify a specific user interface (e.g., a specific screen, a specific webpage) within the particular user interface software workflow for verification.

Using the example illustrated above where new content is added to a login page of the login transaction workflow, since the login transaction workflow may include multiple user interfaces (e.g., a login page, a home page, a login denial page, etc.), the request may specify the login page (e.g., a page identifier corresponding to the login page) within the login transaction workflow for verification. In this example, the data analysis module 208 may identify a particular user interface within the recording (e.g., based on the page identifier), obtain the rendering data (e.g., the DOM tree), and compare the rendering data against the benchmark data.

FIG. 3 illustrates a rendered user interface 300 that represents how the login page was rendered on the first device during the first real-world user interaction session. As shown, the rendered user interface 300 includes a company logo 302, a user name input field 304, a password input field 306, and a submit button 308. In addition, the rendered user interface also includes an image 312 corresponding to the new content that was added to the login transaction workflow. The data analysis module 208 may determine that the rendered user interface 300 does not have any anomalies based on a comparison between the rendered user interface 300 and the benchmark data.

Figure 4:
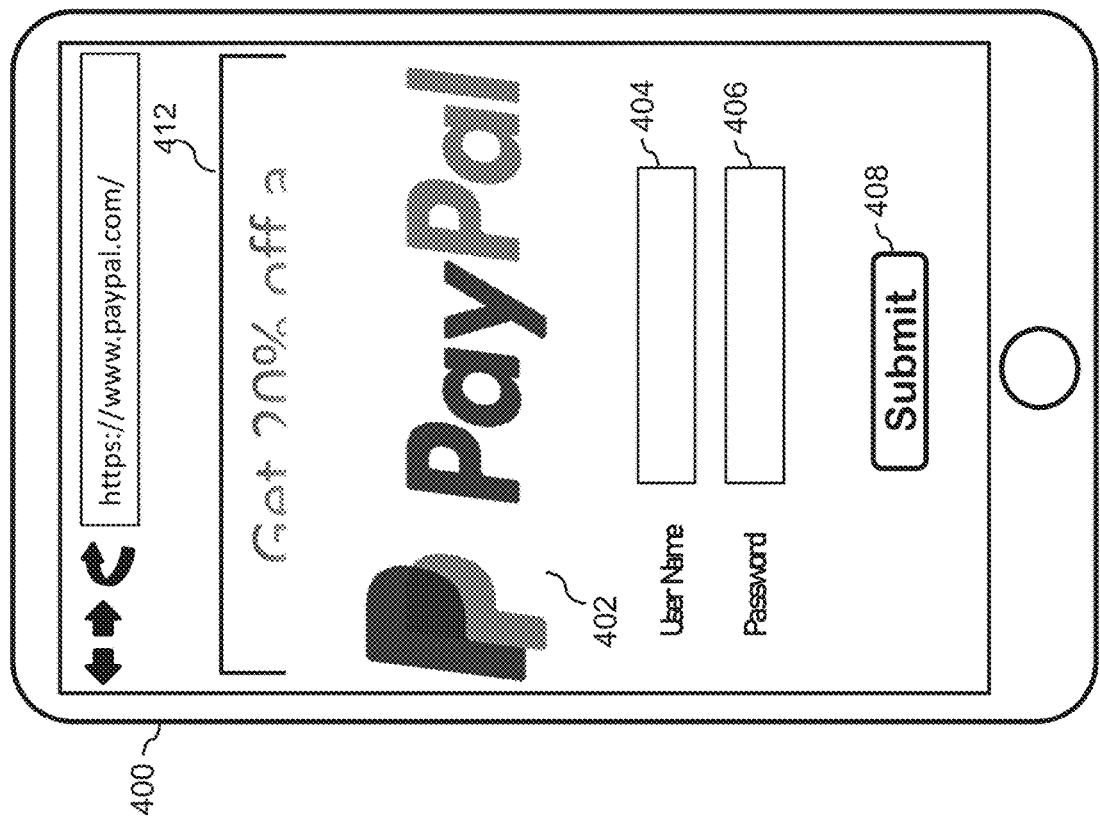
FIG. 4 illustrates a rendering of a user interface during another real-world user interaction session according to an embodiment of the present disclosure.

FIG. 4 illustrates another rendered user interface 400 that represents how the login page was rendered on the second device during the second real-world user interaction session. As shown, the rendered user interface 400 during the first real-world user interaction session includes a company logo 402, a user name input field 404, a password input field 406, and a submit button 408. In addition, the rendered user interface also includes an incomplete (e.g., partial) image 412 corresponding to the new content that was added to the login transaction workflow. The data analysis module 208 may determine that the rendered user interface 400 has an anomaly based on a comparison between the rendered user interface 400 and the benchmark data, as the image 408 was not rendered properly.

When the data analysis module 308 detects an anomaly within a user interface of a real-world user interaction session, the workflow verification manager 202 may transmit a report indicating the anomaly to the device 190 that made the verification request. The report may indicate the anomaly (e.g., missing content, incorrect rendering of content, etc.) and the attributes associated with the real-world user interaction session within which the anomaly occurred (e.g., the device configurations of the second device, the account configurations of the second user account, etc.).

In some embodiments, the UI rendering module 210 may generate a screenshot of the user interface 400 having the anomaly. The workflow verification manager 202 may include the screenshot in the report as well for presenting on the device 190. In some embodiments, the report may also enable the agent to initiate a playback of the second real-world user interface session having the anomaly (e.g., a button for initiating the playback) such that the agent can investigate the anomaly. Upon receiving a selection for initiating the playback, the workflow verification module 132 may present a rendering of a playback of the second real-world user interaction session. For example, the session replay module 206 may render screenshots of all of the user interfaces that were rendered on the second device during the second real-world user interaction session based on the rendering data of the second recording. The rendered screenshots may include all of the user interfaces and all of the changes to the user interfaces (e.g., from user interactions with the user interfaces during the session) during the second real-world user interaction session. The workflow verification manager 202 may present all of the rendered screenshots in a chronological order. In some embodiments, based on the online content request data stored in the recording, the session replay module 206 may infer interactions of the user with the user interfaces (e.g., which actions the user has performed on the user interfaces such as clicking a button, scrolling a page or a frame within a page, dragging an object on a user interface, etc.). The sequence of the user interactions in addition to the progression of rendered user interfaces may form the playback (similar to a video clip of reenacting the second real-world user interaction session). In some embodiments, the session replay module 206 may identify sensitive data (e.g., personal identification information such as names, social security numbers, etc., financial information, health information, etc.) and may redact the sensitive data from the rendering of the user interfaces before presenting the screenshot(s) and/or the playback of the second real-world user interaction session on the device 190 of the agent.

Figure 5:
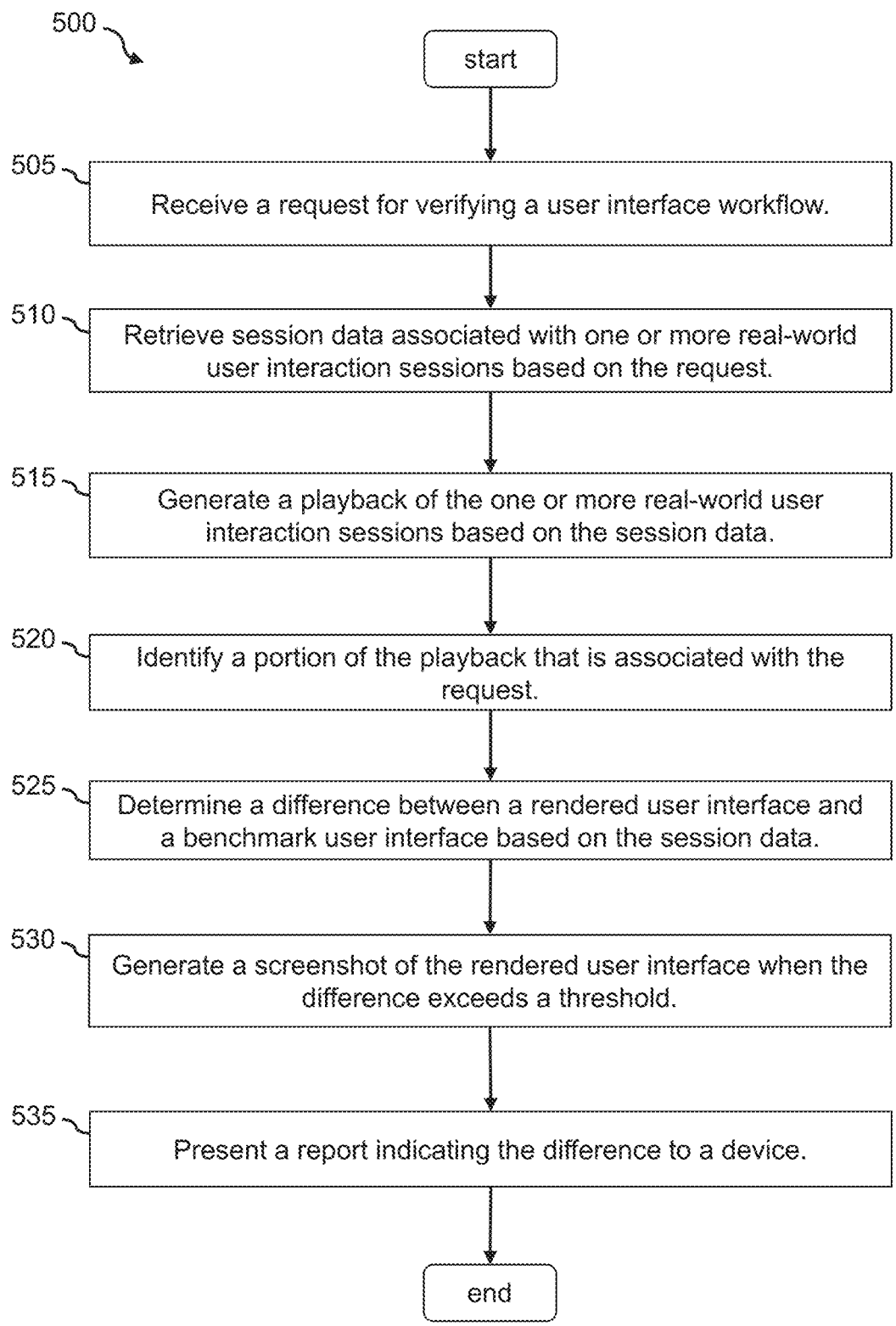
FIG. 5 is a flowchart showing a process of verifying a user interface software workflow according to an embodiment of the present disclosure.

FIG. 5 illustrates a process 500 for verifying a user interface software workflow according to various embodiments of the disclosure. In various embodiments, some or all elements of the process 500 may be performed by the workflow verification module 132 of the service provider server 130. The process 500 begins by receiving (at step 505) a request for verifying a user interface workflow. For example, the workflow verification module 132 may receive a request, from the device 190, to verify a particular user interface software workflow (e.g., a login workflow, a payment workflow, etc.). The process 500 then retrieves (at step 510) session data associated with one or more real-world user interaction sessions based on the request. For example, the request for verifying the user interface workflow may specify one or more criteria, which may include an identification of a specific user interface workflow to be verified (e.g., a login transaction workflow, a payment workflow, a fund withdrawal workflow, etc.). The request may also specify a set of configuration criteria indicating specific device configurations and/or account configurations for which the rendering of the workflow should be verified. Based on the request, the workflow verification manager 202 may search the database 230 (e.g., query against the database) to obtain a subset of recordings of real-world user interaction sessions that are associated with the particular workflow and the configurations.

The process 500 generates (at step 515) a playback of the one or more real-world user interaction sessions based on the session data. For example, the session replay module 208 may generate, from each of the subset of real-world user interaction sessions, a replay of the real-world user interaction session. The replay may include ordering rendering data representing rendered user interfaces that were rendered on a user device during the real-world user interaction session in a chronological order. The rendering data may include rendering code used by a user interface application of the user device for rendering the user interfaces. In some embodiments, the rendering data may include a data structure such as a DOM tree that represents how the user interfaces are rendered on the user device during the session.

At step 520, the process 500 identifies a portion of the playback that is associated with the request. For example, the request may identify one or more user interfaces (e.g., a particular screen, a particular webpage, etc.) for verification, for example, by specifying a page identifier. The data analysis module 208 may identify a portion of the playback (a portion of the rendering data) that corresponds to the page identifier. The process 500 then determines (at step 525) a difference between a rendered user interface and a benchmark user interface based on the session data. For example, the workflow verification manager 202 may obtain benchmark rendering data as part of the request from the device 190. The benchmark rendering data may include rendering code, a data structure (e.g., a DOM tree) that represents how a user interface is rendered, or an image (e.g., a screenshot). In some embodiments, the workflow verification manager 202 may generate the benchmark rendering data automatically based on the recording itself (e.g., the programming code that was transmitted from the service provider server 130 to the user device during the real-world user interaction session).

The data analysis module 208 may compare the user interface that was rendered on the user device during the real-world user interaction session against the benchmark rendering data. For example, the data analysis module 208 may compare the DOM tree stored in the recording against the benchmark DOM tree. In another example, the data analysis module 208 may use the UI rendering module 210 to generate a screenshot of the user interface rendered during the real-world user interaction session based on the rendering data, and compare the screenshot against the benchmark screenshot. In some embodiments, the data analysis module 208 may analyze pixel data associated with the screenshots to determine the difference between the rendered screenshot and the benchmark screenshot.

The process 500 then generates (at step 530) a screenshot of the rendered user interface when the difference exceeds a threshold. For example, when the data analysis module 208 determines that the difference exceeds a threshold (e.g., 20%, 40%), the UI rendering module 210 may generate a screenshot of the rendered user interface that was rendered during the real-world user interaction session based on the rendering data.

The process 500 presents (at step 535) a report indicating the difference to a device. For example, the workflow verification manager 202 may present a report to the device 190 after examining the recordings of all of the subset of real-world user interaction sessions. The report may indicate a number or a percentage of the real-world user interaction sessions that have anomalies (e.g., deviates from benchmark rendering data by the threshold). The report may also indicate the configurations (e.g., device configurations, account configurations, etc.) associated with the real-world user interaction sessions having anomalies. In some embodiments, the report may also include the screenshots of the rendered user interfaces having the anomalies so that the agent may perform further investigations.

By using real-world user interactions with the service provider server 130 to detect anomalies (e.g., deviations from benchmark rendering) in the rendering of user interface (s) associated with a user interface software workflow, the workflow verification module 132 may verify the rendering of user interfaces using real-world examples based on attributes (e.g., device configurations, account configurations, etc.) associated with real-world users. Since the real-world users represent a variety of combinations of attributes, the scenarios covered by the workflow verification system is more comprehensive than conventional simulation-based testing. Furthermore, since no additional traffic is introduced in the detection of rendering anomalies, the performance of the service provider server 130 is not reduced by the verification process.

Figure 6:
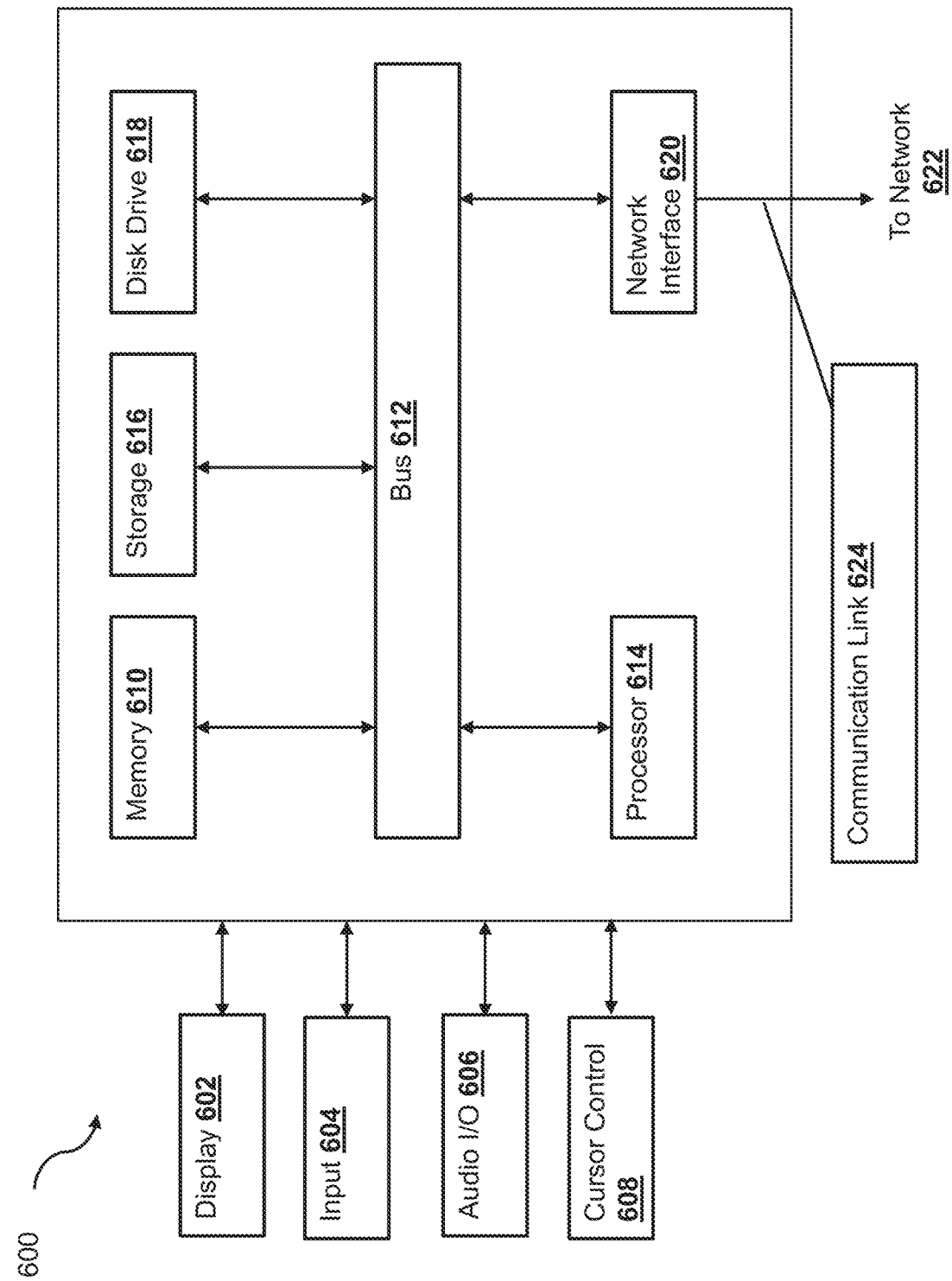
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the content servers 170 and 180, and the client device 110. In various implementations, the client device 110 may include a mobile cellular phone, personal computer (PC), laptop, wearable computing device, etc. adapted for wireless communication, and each of the service provider server 130, and the content servers 170 and 180 may include a network computing device, such as a server. Thus, it should be appreciated that the devices 110, 130, 170, and 180 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform workflow verification functionalities described herein according to the process 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
retrieving session data associated with one or more real-world user interaction sessions between one or more user devices and a service provider server based on a set of configuration criteria, wherein the set of configuration criteria specifies one or more computing environment parameters under which the one or more real-world user interaction sessions were conducted;
accessing a playback of the one or more real-world user interaction sessions, wherein the playback comprises a rendering of a user interacting with one or more user interfaces associated with the service provider server;
determining an intended rendering of the one or more user interfaces according to the set of configuration criteria based on programming code associated with the one or more user interfaces and transmitted from the service provider server to the one or more user devices;
determining whether a deviation exceeding a threshold exists between the rendering of the user interacting with the one or more user interfaces and the intended rendering of the one or more user interfaces; and
presenting, on a device, information associated with the deviation.

2. The system of claim 1, wherein the one or more computing environment parameters comprise at least one of a device type, a processor type, an operating system type, a web browser type, a display size, or a geographical region.

3. The system of claim 1, wherein the operations further comprise:
generating the playback of the one or more real-world user interaction sessions based on the session data.

4. The system of claim 3, wherein the session data comprises a document object model (DOM) tree, wherein the generating the playback of the one or more real-world user interaction sessions is further based on the DOM tree.

5. The system of claim 1, wherein the deviation is associated with missing content in the rendering of the one or more user interfaces.

6. The system of claim 1, wherein the operations further comprise:
determining that the deviation between the rendering of the user interacting with the one or more user interfaces and the intended rendering of the one or more user interfaces exceeds the threshold, wherein the data indicates a particular user interface element associated with the deviation.

7. The system of claim 1, wherein the deviation is associated with a presentation of an image on the one or more user interfaces.

8. A method comprising:
selecting, from a plurality of user interaction sessions between one or more user devices and a service provider server, one or more user interaction sessions that satisfy a set of configuration criteria, wherein the set of configuration criteria specifies one or more computing environment parameters under which the one or more user interaction sessions were conducted;
retrieving, by a computing system, session data associated with the one or more user interaction sessions;
analyzing, by the computing system, a playback of the one or more user interaction sessions, wherein the playback comprises a rendering of a user interacting with one or more user interfaces associated with the service provider server, and wherein the analyzing comprises comparing the rendering of the user interacting with the one or more user interfaces against a particular rendering of the one or more user interfaces according to the set of configuration criteria determined based on programming code associated with the one or more user interfaces and transmitted from the service provider server to the one or more user devices;
determining whether a deviation exceeding a threshold exists between the rendering of the user interacting with the one or more user interfaces and the particular rendering of the one or more user interfaces based on the analyzing; and
presenting, on a device, content associated with the deviation.

9. The method of claim 8, further comprising:
presenting, on the device, the rendering of the user interacting with the one or more user interfaces.

10. The method of claim 8, wherein the rendering of the user interacting with the one or more user interfaces shows a set of user interactions of the user with the one or more user interfaces.

11. The method of claim 8, further comprising:
determining that the deviation between the rendering of the user interacting with the one or more user interfaces and the particular rendering of the one or more user interfaces exceeds the threshold, wherein the deviation comprises at least one of missing content or different presentation of content in the rendering of the user interacting with the one or more user interfaces.

12. The method of claim 11, further comprising:
presenting, on the device, data representing the deviation.

13. The method of claim 12, wherein the data comprises a screenshot from the rendering of the user interacting with the one or more user interfaces.

14. The method of claim 8, wherein the set of configuration criteria comprises: a geographical location associated with a user account, a privacy setting associated with the user account, a risk level associated with the user account, or a balance associated with the user account.

15. A non-transitory machine-readable medium having stored thereon machine-readable instructions executable to cause a machine to perform operations comprising:
selecting, based on a set of configuration criteria, one or more real-world user interaction sessions between one or more user devices and a service provider server, wherein the set of configuration criteria specifies one or more computing environment parameters under which the one or more real-world user interaction sessions were conducted;
retrieving session data associated with the one or more real-world user interaction sessions;
generating a rendering of the one or more real-world user interaction sessions based on the session data, wherein the rendering mimics a user interacting with one or more user interfaces associated with the service provider server;
determining an intended rendering of the one or more user interfaces according to the set of configuration criteria based on programming code associated with the one or more user interfaces and transmitted from the service provider server to the one or more user devices;
determining whether a deviation exceeding a threshold exists between the rendering of the one or more real-world user interaction sessions and the intended rendering of the one or more user interfaces; and
presenting, on a device, information associated with the deviation.

16. The non-transitory machine-readable medium of claim 15, wherein the operations further comprise:
in response to determining that the deviation between the rendering of the one or more real-world user interaction sessions and the intended rendering of the one or more user interfaces exceeds the threshold, presenting, on the device, the rendering of the one or more real-world user interface sessions.

17. The non-transitory machine-readable medium of claim 16, wherein the deviation is associated with a presentation of content on the one or more user interfaces.

18. The non-transitory machine-readable medium of claim 16, wherein the presenting the rendering of the one or more real-world user interface sessions comprises presenting a screenshot from the one or more real-world user interface sessions.

19. The non-transitory machine-readable medium of claim 15, wherein the set of configuration criteria comprises a device configuration representing at least one of: a device type, a processor type, an operating system type, a web browser type, or a display size.

20. The non-transitory machine-readable medium of claim 15, wherein the session data comprises a document object model (DOM) tree, and wherein the rendering of the one or more real-world user interaction sessions is generated based on the DOM tree.

* * * * *